Figures 1, 2, 3:
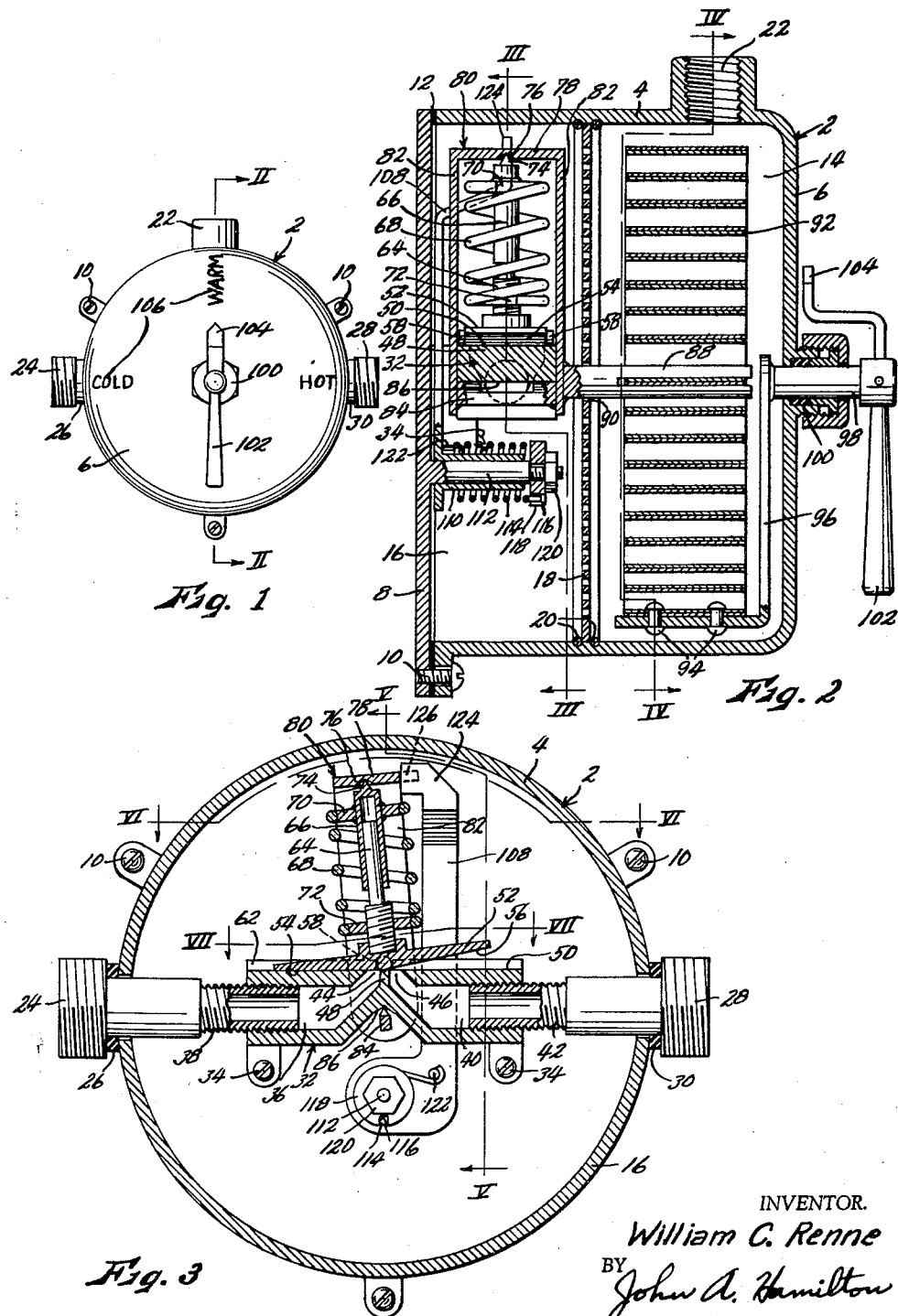

Dec. 11, 1962   W. C. RENNE   3,067,943
THERMOSTATIC MIXING VALVE
Filed Oct. 25, 1961   2 Sheets-Sheet 1

INVENTOR.
William C. Renne
BY John A. Hamilton
Attorney.

INVENTOR.
William C. Renne
BY John A. Hamilton
Attorney.

United States Patent Office 3,067,943
Patented Dec. 11, 1962

3,067,943
THERMOSTATIC MIXING VALVE
William C. Renne, 901 W. 87th St., Kansas City 14, Mo.
Filed Oct. 25, 1961, Ser. No. 147,564
11 Claims. (Cl. 236—12)

This invention relates to new and useful improvements in thermostatic mixing valves, and is an improvement over the valve shown in my co-pending application, Serial No. 70,704, filed November 21, 1960.

The invention relates to the class of thermostatic mixing valves wherein the hot and cold water inlets are controlled by a single closure member or valve movable between said inlets, so that as it moves to open one of said inlets, it simultaneously throttles the other inlet, whereby to proportion the flow of hot and cold water, and having a temperature-sensitive element disposed in the path of flow of the hot and cold water mixture and operable to control the valve member to produce a mixture of the desired temperature. Valves of this type have been subject to inaccuracies of temperature control due to variations of the supply pressures of the hot and cold water. Such variations of pressure change the motive power required to move the closure valve against the flow pressure of the entering streams of water, and since the temperature-sensitive element is inherently capable of delivering only one motive force at one temperature of the water mixture, loss of accurate temperature control results. Moreover, even if the supply pressures remain constant, movement of the closure member to a position in which it throttles one of the inlets requires greater operating force, since the water flowing through said inlet exerts the greatest pressure against the closure member just before said inlet is completely closed. This causes loss of sensitivity of temperature control, particularly near the ends of the temperature control range wherein one or the other of the inlets must be rather severely throttled.

In my prior application, above identified, I disclosed a solution to these problems employing a spring-loaded toggle mechanism interposed between the temperature-sensitive element and the closure member, and so connected that whenever the closure member was moved in either direction from a neutral or dead-center position by the temperature-sensitive element, toward one or the other of the water inlets, the toggle automatically supplied additional force tending to move the closure member in the same direction. The total motive force on the closure member thus constituted a combination of the forces supplied by the temperature-sensitive element and by the toggle, and since the toggle force was independent of any pressure variations, the actual force required from the temperature-sensitive element was only a small portion of the total, and variations in supply pressures thus had only a very small effect on the delivery temperature. Moreover, the toggle was so arranged that the force supplied thereby increased gradually as the closure member moved toward either of the inlets. This compensated for the fact that greater power is required to move the closure member into close throttling relation to an inlet than is required when the inlet is comparatively wide open, and thus improved the sensitivity of control under conditions calling for severe throttling of either inlet.

While the above described structure as set forth in my co-pending application was quite effective in overcoming inaccuracy of temperature control due to pressure variations, it also introduced certain other undesirable characteristics into the operation of the valve. For example, when conditions called for the movement of the closure member to be reversed, the temperature-sensitive element, which is then tensioned to urge the closure member in one direction, must first be relaxed by the changed temperature of the water mixture, and be tensioned in the opposite direction to move the closure member. This causes an objectionable time lag in the response of the closure member. Also, under certain conditions such as low-pressure service, the temperature-sensitive element must additionally build up sufficient reverse tension to overcome the pressure of the toggle, which is then urging the closure member in the opposite direction. This results in a still greater lag in response. The effect of this time lag is a sluggishness of slowness of operation, in that the valve will not adjust rapidly to a change of water temperature or pressure. Also, as a result of this slow response, the valve tends to "hunt" excessively. That is, for example, if more hot water is called for, the valve will tend to deliver more hot water than is called for, before the temperature-responsive element can again respond to halt the movement of the closure member. The delivery temperature therefore tends to vary first above and then below the desired temperature for a substantial period of time, though in successively smaller degrees, before a condition of equilibrium is again reached. The provision of means for overcoming this slowness or sluggishness of response is the primary object of the present invention.

Generally, this object is accomplished by the provision of resilient means biasing the closure member in one direction at all times, against the motive force of the temperature-sensitive element, and with a force greater than the maximum force capable of being applied thereto by the toggle. In this arrangement the temperature-sensitive element is under uni-directional tension at all times, and will move the closure member in one direction or the other depending on whether said uni-directional tension is greater or less than the resultant of the forces exerted on said closure member by water pressure, the toggle and the biasing means. Thus the closure member starts its movement in response to a temperature change the very instant the tension of the temperature-sensitive element begins to change, and the time lag which the temperature-sensitive element has required to relax and build up a reverse tension is eliminated. This greatly improves the speed of response of the valve. Moreover, the biasing means does not interfere with the action of the toggle in combating the effects of pressure changes on the accuracy of the valve. Said toggle still supplements the motive force of the temperature-sensitive element in moving the closure member in either direction, by adding to the force of the biasing member when moving the closure member in one direction, and by subtracting from the resistance force of the biasing member when moving the closure member in the opposite direction.

Another object is the utilization of the biasing means above discussed as a safety device, in that it functions automatically to shut off the hot water inlet in the event of breakage or failure of the temperature-sensitive element, to prevent scalding of a person when, for example, the valve is being used to supply water to a shower head.

Other objects are simplicity and economy of construction, efficiency and dependability of operation, and freedom from excessive service requirements.

Figure 4:
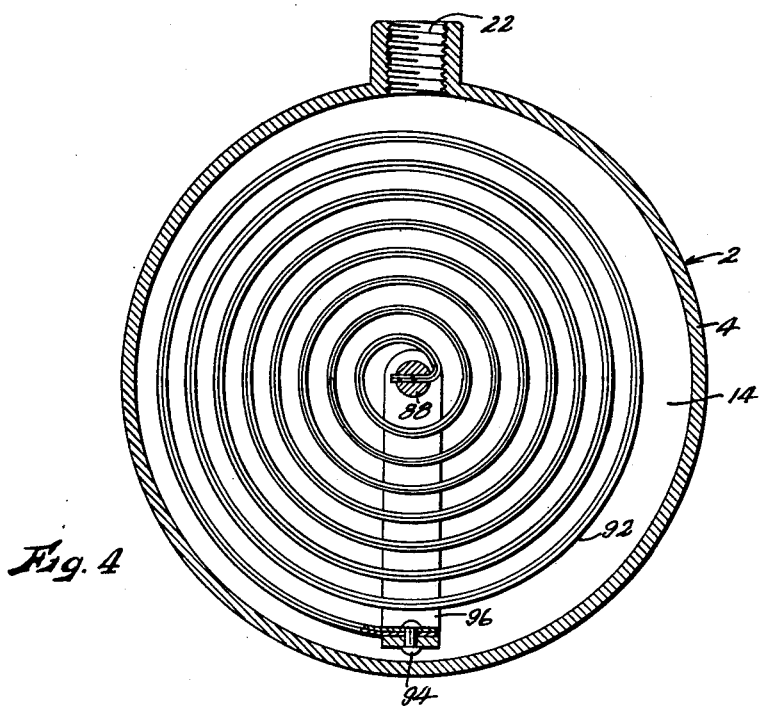
Figure 6:
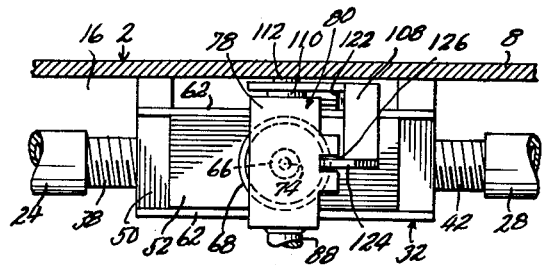
Figure 7:
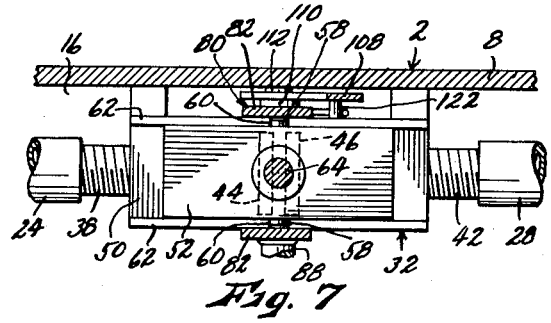
Figure 5:
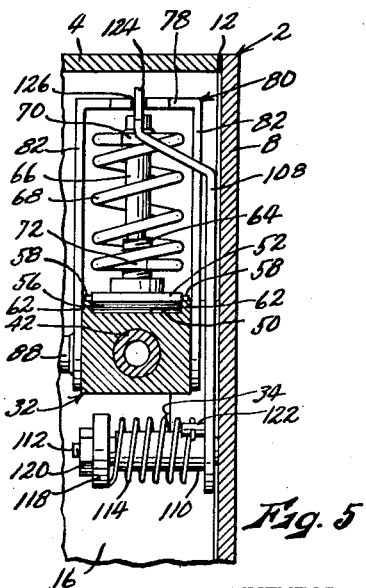

With these objects in view, as well as other objects which will appear in the course of the specification, reference will be had to the drawings, wherein:

FIG. 1 is a front elevational view of a thermostatic mixing valve embodying the present invention, FIG. 2 is an enlarged sectional view taken on line II—II of FIG. 1, with the toggle in its dead-center position, and with parts left in elevation and partially broken away, FIG. 3 is a sectional view taken on line III—III of FIG. 1, showing the toggle in position to close the hot water inlet, with parts left in elevation and partially broken away, FIG. 4 is a sectional view taken on line IV—IV of FIG. 2, and FIGS. 5, 6 and 7 are fragmentary sectional views taken respectively on lines V—V, VI—VI and VII—VII of FIG. 3, with the toggle in its dead-center position.

Like reference numerals apply to similar parts throughout the several views, and the numeral 2 applies generally to a housing which is generally cylindrical with a horizontal axis, having a cylindrical wall 4, a generally planar front wall 6 integral with said cylindrical wall, and a rear wall 8 constituting a cover plate affixed to cylindrical wall 4 by screws 10 and sealed by gasket 12. Said housing is divided into a forward thermostat chamber 14 and a rear valve chamber 16 by a perforated circular plate 18 parallel to and intermediate the front and rear walls, and secured in said housing by snap rings 20. Thermostat chamber 14 is provided at its top with an outlet 22 into which a water delivery pipe may be threaded. A tubular hot water supply fitting 24 extends through wall 4 into valve chamber 16, a gasket 26 forming a seal thereabout. At a point diametrically opposite fitting 24, a tubular cold water fitting 28 extends through wall 4 into chamber 16, and is provided with a sealing gasket 30. Hot and cold water supply pipes may be interconnected respectively to the outer ends of fittings 24 and 28. Shut-off valves may be inserted in said supply pipes, but are not pertinent to the present invention and are not here shown.

A mixing valve body 32 is disposed within valve chamber 16, being secured to the forward face of housing rear wall 8 by screws 34. Said valve body encloses a hot water chamber 36 interconnected to hot water fitting 24 by a threaded pipe nipple 38, and a cold water chamber 40 interconnected with cold water fitting 28 by a threaded pipe nipple 42. Said hot and cold water chambers are provided respectively with outlets 44 and 46 which open in side-by-side relation through the planar upper surface 50 of the valve body, said outlet openings being separated by a partition wall 48 of said valve body.

Valve body outlets 44 and 46 are controlled by a valve block or closure member 52 disposed adjacent surface 50 of the valve body. Said valve block is provided, on the side thereof confronting the valve body, with a pair of planar faces 54 and 56 disposed at an obtuse angle to each other, the ridge or angle at the juncture of said faces resting on the upper edge of partition wall 48 of the valve body. Said valve block is provided with a pair of oppositely extending trunnions 58 which are co-axial, parallel with valve body surface 50, and parallel to the axis of housing 2. Said trunnions are respectively pivotally supported in notches 60 (see FIG. 7) formed in upstanding walls 62 formed integrally with the valve body, and extending along the opposite edges of the valve block at right angles to the trunnion axis. Referring to FIG. 3, it will be seen that as the block is pivoted to the left or counter-clockwise about trunnions 58, face 54 thereof approaches and throttles hot water outlet 44, while face 56 thereof moves away from and hence opens cold water outlet 46. Conversely, when the valve block is pivoted in a clockwise direction, face 56 thereof approaches and throttles cold water outlet 46, while face 54 thereof moves away from and opens hot water outlet 44. In its neutral or dead-center position, faces 54 and 56 of the valve block are disposed at equal angles to valve body surface 50, and outlets 44 and 46 are equally open.

A rod-like valve stem 64 is rigidly affixed at its lower end in valve block 52, and extends upwardly therefrom, being at right angles to trunnions 58 and bisecting the angle between faces 54 and 56 of the valve block. Said stem has a threaded lower portion, while its upper portion is smooth. A sleeve 66 is mounted on the smooth portion of the stem for axial rotation and longitudinal sliding movement thereon. A helical compression spring 68 surrounds the stem, being fixed at its upper end to a disc 70 welded on sleeve 66, and being fixed at its lower end to a nut 72 mounted adjustably on the threaded portion of the stem. The upper end of sleeve 66 is closed, and is provided with an upwardly and axially projecting conical point 74 which engages pivotally in a conical socket 76 formed in the connecting portion 78 and a U-shaped arm 80. The parallel side members 82 of said arm extend downwardly past the forward and rearward edges of valve body 32, and are connected at their lower ends by a knife-edged bar 84 rigidly affixed thereto. The knife-edged bar engages pivotally in a V-shaped groove 86 formed in the lower side of the valve body, the axis of the pivot thus formed being parallel to valve block trunnions 58 and lying in the same vertical plane as said trunnions, but being spaced apart therebelow. By turning nut 72 upwardly on stem 64, spring 68 may be tensioned to urge point 74 of sleeve 66 upwardly into socket 76, thereby urging pivot bar 84 upwardly into groove 86, and urging valve block 32 downwardly against surface 50 of the valve body.

Thus it will be seen that the valve block is controlled by a toggle mechanism, stem 64 and sleeve 66 constituting one leg of the toggle, and arm 80 constituting the other leg of the toggle. When valve block 52 is in its neutral position in which outlets 44 and 46 are equally open, the toggle legs are in alignment with each other, and spring 68 exerts no force tending to pivot the valve block in either direction. This is the dead-center position. However, when the toggle is pivoted in either direction from this dead-center position by the temperature-responsive element to be described, the toggle legs move out of alignment with each other, as shown in FIG. 3, and a component of the force of spring 68 then tends to pivot the toggle still farther in the direction of its original movement. Moreover, the greater the movement of the toggle in either direction, the greater will be the component of the spring force acting to urge the toggle in that direction, due to the increased misalignment of the toggle legs.

The toggle is actuated by a shaft 88 welded or otherwise affixed to the forward side member 82 of arm 80 in coaxial relation with the knife-edge of pivot bar 84 of said arm. Said shaft extends forwardly through a hole 90 formed therefor in perforated plate 18, and into thermostat chamber 14 of the housing. A temperature-responsive element constituting a spiral bimetallic thermostat 92 is disposed in chamber 14 coaxially therewith. The inner end of said thermostat is affixed to shaft 88, and the outer end of said thermostat is affixed, as by rivets 94, to the outer end of a radially extending arm 96, said arm being welded or otherwise rigidly fixed at its other end to a shaft 98 coaxial with shaft 88 and extending centrally through front wall 6 of the housing, said front wall being provided with the usual stuffing-box 100 which serves both to seal the housing and to prevent turning of shaft 98 by any force exerted thereon by the thermostat. Said shaft may be turned only by manual force applied thereto by a handle 102 affixed thereto externally of the housing. Said handle is provided with a pointer 104 which moves in reference to indicia 106 imprinted on the outer surface of front wall 6.

The valve thus far described, with the exception of a different thermostat and other minor details, is substantiantially the same as that disclosed in my prior application. In operation, hot and cold water enter respectively through fittings 24 and 28 into valve body 32, and leave said valve body through outlets 44 and 46. The water mixture then passes through perforated plate 18 and over thermostat 92, and leave the housing through outlet 22. Perforated plate 18 insures thorough intermixture of the hot and cold water, and insure uniform distribution thereof over the thermostat. Other baffles or the like could be utilized for this purpose if so desired. The proportioning of the hot and cold water is of course controlled by the position of valve block 52, since it controls the outlets 44 and 46, and the block is actuated by the thermostat.

If, for example, changing conditions of supply temperature or pressure, or a change in the setting of handle 102, should result in a water mixture engaging thermostat 92 which is hotter than the temperature for which the thermostat is set, said thermostat will function through the toggle to pivot valve block 52 to the left as viewed in FIG. 3, thereby throttling outlet 44 to deliver less hot water, and opening outlet 46 to deliver more cold water, and the adjustment continues until a condition of equilibrium is reached in which the tension of the thermostat is balanced by the forces action on the valve block. If the valve has been properly calibrated, the temperature of the water leaving outlet 22 will correspond to the setting of handle 102.

The toggle, which was the primary subject matter of my prior application, is quite effective in its intended function of rendering the valve comparatively free of inaccuracies of temperature control due to variations of water pressure on the valve block. That is, spring 68 of the toggle assists and complements the force of the thermostat in adjusting the valve block. The force required to adjust the block of course varies with the flow pressure of the water against the faces 54 and 56 thereof. Thus the thermostat is required to furnish only a small portion of the total force required, the major portion being supplied by the toggle action, which is not subject to changes of water pressure, and the valve is therefore much less subject to inaccuracies of control resulting from such pressure changes. The toggle applies force in either direction, depending on the direction it is originally moved from its dead-center position by the thermostat, and the tension of spring 68 may be adjusted by turning nut 72 on stem 64. Also, the toggle force increases gradually as it moves greater distances from its dead-center position, which compensates for the fact that greater force is required to move the valve block as said block moves into closer throttling relation with either of the outlets 44 or 46.

However, the valve as above described proved to have one substantial disadvantage in that it is somewhat sluggish or slow to respond to changing conditions of pressure and temperature, which is of course objectionable, and also tended to show fluctuation of the outlet temperature alternately above and below the desired temperature for an objectionable period of time before a condition of equilibrium was reached. This sluggishness and fluctuation resulted partially from the fact that a positive force is required to move the valve block in either direction from its neutral position, against the water pressures exerted thereon, and from the fact that the thermostat is in essence a spring of variable tension inherently capable of exerting force in only one direction at a time. Therefore, to effect the reversal of force necessary to shift the valve block from one side of its neutral position to the other, the thermostat was required not only to relax its original tension completely, but also to build up a reverse tension. This relaxation and build-up of reverse tension required a definite and objectionably long period of time, with the resultant slow response. The slow response also occurred when the valve block reached its new position, so that it moved too far and resulted in excessive movement of the block and "over control" of the temperature, and this caused the objectionable fluctuation or "hunting" before equilibrium was established. Also, the toggle spring 68 exerted a positive force in the direction in which the block was moved, and under certain conditions such as a sudden drop of pressure at the outlet 44 or 46 to which the block was then closer, the thermostat additionally had to overcome the pressure of the toggle spring before the movement of the block could be reversed. This required a still further build-up of reverse tension in the thermostat, and resulted therefore in still greater sluggishness and slower response.

To overcome the sluggishness and fluctuation as above discussed in the present valve, I have included means resiliently biasing the toggle and valve block in one direction at all times, with a force greater than the total force which can be exerted on said block by any combination of the toggle spring and water pressure. This means includes an arm 108 provided at its lower end with a hub 110 pivoted on a post 112 fixed in rear wall 8 of the housing. Said post is parallel to and disposed in the same vertical plane as trunnions 58 and pivot 84, but is spaced below valve body 32. A torsion spring 114 is disposed around hub 110, one end of said spring being engaged in a notch 116 of a disc 118 fixed to the outer end of post 112 by nut 120, and the other end of said spring engaging a pin 122 fixed to arm 108, whereby to urge said arm to the left or in a counter-clockwise direction as viewed in FIG. 3. The tension of said spring may be adjusted by loosening nut 120 and turning disc 118 on post 112. Arm 108 extends upwardly behind valve body 32, and the free end portion 124 thereof is offset forwardly and presses yieldably against the connecting portion 78 of toggle arm 80, engaging in a notch 126 of said toggle arm, whereby to urge said toggle arm to the left.

It will be understood that arm 108 urges the toggle to the left with a force greater than the maximum pressure to the right which can be exerted by the toggle spring and water pressure acting on face 54 of the valve block. That is, if the thermostat were disconnected and the valve block was tilted all the way to the right to close cold water outlet 46, arm 108 would tilt the valve block all the way to the left to close hot water inlet 44 even if the cold water pressure were zero and the hot water pressure were at its maximum level. Thus the thermostat must be tensioned to move the toggle to the right, and must remain under tension in this direction at all times to hold the toggle in any position except that shown in FIG. 3. Thus under all operating conditions the thermostat is under a uni-directional tension, and will cause the toggle and valve block to move to the right or left depending on whether the tension thereof is greater or less than the resultant of the toggle and water pressures on the valve block. Thus, since the thermostat need never relax completely nor build up a reverse tension, the adjusting movement of the block begins instantly when the tension of the thermostat begins to change. Since the thermostat need never relax or reverse its tension, the source of the delay causing the slow response of the valve is eliminated, and much faster response is provided. Portion 124 of arm 108 has a slight sliding movement in notch 126 of arm 80, which applies a frictional braking force resisting movement of the toggle slightly. This prevents oscillation or vibration of the toggle which might otherwise occur, and hence provides smoother operation.

Moreover, despite the fact that arm 108 overcomes the force of toggle spring 68, the advantages of the toggle in eliminating inaccuracies of control due to variation of water pressures are not lost. Said toggle still functions to complement the force of the thermostat when moving the valve block in either direction from its neutral position, and this complementary force still increases proportionately as either face of the valve block more closely approaches throttling relation to its corresponding valve body outlet 44 or 46. More accurately speaking, when the toggle is moved to the left by arm 108 due to relaxation of the thermostat, spring 68 indirectly complements the thermostat force by supplying a gradually increasing additional force to the left. When the toggle is moved to the right against arm 108 due to an increase of tension of the thermostat, spring 68 indirectly complements the thermostat force by exerting a gradually increasing force to the right, thereby subtracting from the resistance offered by arm 108.

While the advantages of faster response above described could be achieved by biasing arm 108 urging the toggle to the right instead of to the left, the change requiring only a resetting or re-calibration of the thermostat, it will nevertheless be apparent that biasing the toggle and valve block toward closure of the hot water outlet 44, as shown, is a valuable safety feature. It provides for automatic cut-off of the hot water in the event the thermostat should break or fail, and hence would, for example, prevent scalding of a bather if the valve were being used to supply water to a shower head.

While I have shown and described a specific embodiment of my invention, it will be readily apparent that many minor changes of structure and operation could be made without departing from the spirit of the invention as defined by the scope of the appended claims.

What I claim as new and desire to protect by Leters Patent is:

1. A thermostatic mixing valve comprising:
   a. a housing having an outlet for mixed hot and cold water and inlets for hot and cold water,
   b. a valve body mounted in said housing and having hot and cold water inlets connected respectively to said housing inlets and a pair of outlet openings through which hot and cold water respectively may pass from said valve body into said housing,
   c. a valve closure member carried movably by said body member, being operable when moved in one direction to throttle and close one of said valve body outlets and when moved in an opposite direction to throttle and close the other of said valve body outlets, and having a neutral position in which said valve body outlets are equally open,
   d. a thermostatic element disposed in said housing and connected to said closure member and being reversible to urge said closure member in one direction or the other from its neutral position depending on the temperature of the mixed hot and cold water in said housing, and
   e. biasing means urging said closure member yieldably in one direction at all times, against the force applied thereto by said thermostatic element, with sufficient force to overcome all forces acting on said closure member except said thermostatic element, whereby said thermostatic element is subjected to unidirectional resistance at all times.

2. A thermostatic mixing valve as recited in claim 1 with the addition of:
   a. means for manually adjusting the tension of said thermostatic element.

3. A thermostatic mixing valve as recited in claim 1 with the addition of:
   a. means for manually adjusting the tension of said biasing means.

4. A thermostatic mixing valve as recited in claim 1 with the addition of:
   a. means for manually adjusting the tension of said thermostatic element, and
   b. means for manually adjusting the tension of said biasing means.

5. A thermostatic mixing valve as recited in claim 1 wherein said biasing means urges said closure member in a direction to throttle and close the hot water outlet of said valve body.

6. A thermostatic mixing valve comprising:
   a. a housing having an outlet for mixed hot and cold water and inlets for hot and cold water,
   b. a valve body mounted in said housing and having hot and cold water inlets connected respectively to said housing inlets and a pair of outlet openings through which hot and cold water respectively may pass from said valve body into said housing,
   c. a valve closure member carried movably by said body member, being operable when moved in one direction to throttle and close one of said valve body outlets and when moved in an opposite direction to throttle and close the other of said valve body outlets, and having a neutral position in which said valve body outlets are equally open,
   d. a toggle linkage interconnecting said valve body and said closure member and having a dead-center position corresponding to the neutral position of said closure member,
   e. a spring loading said toggle linkage, said spring being inoperative at the dead-center position of said toggle but functioning to urge said toggle with increasing force in its direction of movement when said linkage is moved in either direction from said dead-center position,
   f. a thermostatic element disposed in said housing and connected to said toggle linkage and being reversible to urge said linkage in one direction or the other from its dead-center position depending on the temperature of the mixed hot and cold water in said housing, and
   g. biasing means urging said toggle linkage yieldably in one direction at all times, against the force applied thereto by said thermostatic element, with sufficient force to overcome all forces acting on said closure member except said thermostatic element, but including said toggle spring, whereby said thermostatic element is subjected to unidirectional resistance at all times.

7. A thermostatic mixing valve as recited in claim 6 wherein said biasing means urges said toggle linkage, and hence said closure member, in a direction to throttle and close the hot water outlet of said valve body.

8. A thermostatic mixing valve as recited in claim 6 with the addition of:
   a. means for manually adjusting the tension of said toggle spring.

9. A thermostatic mixing valve as recited in claim 6 with the addition of:
   a. means for manually adjusting the tension of said toggle spring, and
   b. means for manually adjusting the tension of said biasing means.

10. A thermostatic mixing valve as recited in claim 6 with the addition of:
    a. means for manually adjusting the tension of said toggle spring,
    b. means for manually adjusting the tension of said biasing means, and
    c. means for manually adjusting the tension of said thermostatic element.

11. A thermostatic mixing valve as recited in claim 6 wherein said biasing means has frictional sliding engagement with said toggle linkage during movement of the later, whereby to provide a braking action.

References Cited in the file of this patent

UNITED STATES PATENTS

| | | |
|---|---|---|
| 2,070,108 | Bargeboer | Feb. 9, 1937 |
| 2,204,792 | Davis | June 18, 1940 |
| 2,242,649 | Leonard | May 20, 1941 |
| 2,296,917 | Garrett et al. | Sept. 29, 1942 |
| 2,305,429 | Johnson | Dec. 15, 1942 |
| 2,874,924 | Good | Feb. 24, 1959 |

FOREIGN PATENTS

| | | |
|---|---|---|
| 186,883 | Austria | Sept. 25, 1956 |